(12) United States Patent
Bryan et al.

(10) Patent No.: US 11,477,393 B2
(45) Date of Patent: Oct. 18, 2022

(54) DETECTING AND TRACKING A SUBJECT OF INTEREST IN A TELECONFERENCE

(71) Applicant: Plantronics, Inc., Santa Cruz, CA (US)

(72) Inventors: David A. Bryan, Cedar Park, TX (US); Wei-Cheng Su, Bellevue, WA (US); Stephen Paul Schaefer, Cedar Park, TX (US); Alain Elon Nimri, Austin, TX (US); Casey King, Austin, TX (US)

(73) Assignee: PLANTRONICS, INC., Santa Cruz, CA (US)

( * ) Notice: Subject to any disclaimer, the term of this patent is extended or adjusted under 35 U.S.C. 154(b) by 0 days.

(21) Appl. No.: 17/204,062

(22) Filed: Mar. 17, 2021

(65) Prior Publication Data

US 2021/0235024 A1    Jul. 29, 2021

Related U.S. Application Data

(63) Continuation of application No. 16/773,282, filed on Jan. 27, 2020, now Pat. No. 10,999,531.

(51) Int. Cl.
| | |
|---|---|
| *H04N 5/262* | (2006.01) |
| *G06T 7/70* | (2017.01) |
| *H04N 7/14* | (2006.01) |
| *G06V 10/26* | (2022.01) |
| *G06V 40/10* | (2022.01) |

(52) U.S. Cl.
CPC ............ *H04N 5/2628* (2013.01); *G06T 7/70* (2017.01); *G06V 10/26* (2022.01); *G06V 40/10* (2022.01); *H04N 7/147* (2013.01); *G06T 2207/30201* (2013.01); *G06T 2207/30244* (2013.01)

(58) Field of Classification Search
USPC .................................. 348/14.02–14.9, 14.16
See application file for complete search history.

(56) References Cited

U.S. PATENT DOCUMENTS

| | | |
|---|---|---|
| 7,460,150 B1 | 12/2008 | Coughlin |
| 8,872,878 B2 | 10/2014 | Byers et al. |
| 9,445,047 B1 | 9/2016 | Frueh |
| 9,600,723 B1 | 3/2017 | Pantofaru |
| 9,805,501 B2 | 10/2017 | Huang |

(Continued)

OTHER PUBLICATIONS

International Search Report and Written Opinion dated May 7, 2021 for PCT/US2021/015116.

(Continued)

*Primary Examiner* — Maria El-Zoobi
(74) *Attorney, Agent, or Firm* — Ramey LLP; Jacob B. Henry (57) ABSTRACT

A method of view selection in a teleconferencing environment includes receiving a frame of image data from an optical sensor such as a camera, detecting one or more conference participants within the frame of image data, and identifying an interest region for each of the conference participants. Identifying the interest region comprises estimating head poses of participants to determine where a majority of the participants are looking and determining if there is an object in that area. If a suitable object is in the area at which the participants are looking, such as a whiteboard or another person, the image data corresponding to the object will be displayed on a display device or sent to a remote teleconference endpoint.

20 Claims, 9 Drawing Sheets

(56) References Cited

U.S. PATENT DOCUMENTS

| | | |
|---|---|---|
| 9,912,908 B2 | 3/2018 | Feng |
| 9,942,518 B1 | 4/2018 | Tangeland |
| 10,091,412 B1 | 10/2018 | Feng et al. |
| 10,148,913 B2 | 12/2018 | Nimri et al. |
| 10,187,579 B1 | 1/2019 | Wang et al. |
| 10,582,117 B1 | 3/2020 | Tanaka |
| 2002/0196328 A1 | 12/2002 | Piotrowski |
| 2010/0208078 A1* | 8/2010 | Tian .................... G06T 7/73 348/169 |
| 2012/0293606 A1* | 11/2012 | Watson ................ H04N 5/232 348/E7.085 |
| 2014/0063176 A1 | 3/2014 | Modai et al. |
| 2018/0039856 A1* | 2/2018 | Hara ................ G06N 3/0472 |
| 2018/0176508 A1 | 6/2018 | Pell |
| 2019/0158733 A1 | 5/2019 | Feng et al. |
| 2019/0260965 A1 | 8/2019 | Morabia et al. |

OTHER PUBLICATIONS

Burrows, T.D; "Television Production: Disciplines and Techniques."McGraw-Hill Higher Education. Figure 6-15, (1991) 5th Edition, ISBN-139780697129178.

* cited by examiner

DETECTING AND TRACKING A SUBJECT OF INTEREST IN A TELECONFERENCE

CROSS-REFERENCE TO RELATED APPLICATION

This application is a continuation of U.S. application Ser. No. 16/773,282, filed Jan. 27, 2020, and entitled DETECTING AND FRAMING TRACKING A SUBJECT OF INTEREST IN A TELECONFERENCE. U.S. application Ser. No. 16/773,282 is entirely incorporated by reference herein.

TECHNICAL FIELD

This disclosure relates generally to videoconferencing and relates particularly to accurately estimating the head pose of conference participants.

BACKGROUND

During a videoconference, people at a videoconferencing endpoint interact with people at one or more other videoconferencing endpoints. There exist systems to capture views of conference participants from different angles. Attempts to create systems which automatically select and frame the optimal view for transmission to a remote endpoint based primarily on who is currently speaking have not been wholly satisfactory. Thus, there is room for improvement in the art.

SUMMARY

In accordance with an example of this disclosure, a method of view selection in a teleconferencing environment includes receiving a frame of image data from an optical sensor such as a camera, detecting one or more conference participants within the frame of image data, and identifying an interest region for each of the conference participants. Identifying the interest region comprises estimating head poses of participants to determine where many of the participants are looking and determining if there is an object in that area. If a suitable object is in the area at which the participants are looking, such as a whiteboard or another person, the image data corresponding to the object will be displayed on a display device or sent to a remote teleconference endpoint, or rendered in some other fashion.

An example of this disclosure is a method of view selection in a teleconferencing environment, comprising: receiving a frame of image data from an optical sensor; detecting one or more conference participants within the frame of image data; identifying an interest region for each of the one or more conference participants, wherein identifying the interest region for each of the one or more conference participants comprises estimating a head pose of a first participant from among the one or more conference participants; determining that a majority of the interest regions overlap in an overlapping region; detecting an object within the overlapping region; determining that the object within the overlapping region is a subject of interest; and rendering a view containing the subject of interest.

Another example of this disclosure includes a teleconferencing endpoint, comprising: an optical sensor configured to receive a frame of image data; a processor coupled to the optical sensor, wherein the processor is configured to: detect one or more conference participants within the frame of image data; identify an interest region for each of the one or more conference participants by estimating a head pose of a first participant from among the one or more conference participants; determine that most of the interest regions overlap in an overlapping region; detect an object within the overlapping region; determine that the object within the overlapping region is a subject of interest; and render a view containing the subject of interest.

Another example of this disclosure includes a non-transitory computer readable medium storing instructions executable by a processor, the instructions comprising instructions to: receive a frame of image data from an optical sensor; detect one or more conference participants within the frame of image data; identify an interest region for each of the one or more conference participants, wherein identifying the interest region for each of the one or more conference participants comprises estimating a head pose of a first participant from among the one or more conference participants; determine that more of the interest regions overlap in an overlapping region; detect an object within the overlapping region; determine that the object within the overlapping region is a subject of interest; and render a view containing the subject of interest within a transmission to a remote endpoint.

BRIEF DESCRIPTION OF THE DRAWINGS

For illustration, there are shown in the drawings certain examples described in the present disclosure. In the drawings, like numerals indicate like elements throughout. The full scope of the inventions disclosed herein are not limited to the precise arrangements, dimensions, and instruments shown. In the drawings.

DETAILED DESCRIPTION

In the drawings and the description of the drawings herein, certain terminology is used for convenience only and is not to be taken as limiting the examples of the present disclosure. In the drawings and the description below, like numerals indicate like elements throughout.

Terms

Throughout this disclosure, terms are used in a manner consistent with their use by those of skill in the art, for example:

A centroid or geometric center of a plane figure is the arithmetic mean position of all the points in the figure.

A normal is an object such as a line or vector that is perpendicular to a given object. In two dimensions, the normal line to a curve at a given point is the line perpendicular to the tangent line to the curve at the point. In three dimensions, a normal to a surface at a point is a vector perpendicular to the tangent plane of the surface at that point.

Discussion

In one or more examples of this disclosure, a subject of interest is determined based on multiple factors. In at least one example of this disclosure, a videoconferencing device can detect and focus on an active talker. One or more microphone arrays can be used to determine the direction from the videoconferencing device to the active talker. In one or more examples of this disclosure, one or more cameras are used to locate the face of an active talker. In some examples, sound source localization is used to detect an active talker. In some examples, body detection is used to detect an active talker. In some examples, lip motion detection is used to locate the current speaker. In at least one example, when the current speaker is located, one or more cameras can be automatically directed toward him or her. A view of the active talker can be captured for transmission to another endpoint and the active talker can be tracked during a videoconference.

In some examples of this disclosure, other bases for selecting one or more views (or portions of views) for rendering are utilized. In at least one example, a diagram at an endpoint will be the subject of interest when a speaker refers to the diagram. In at least one example, a meeting participant at an endpoint with a speaker will be the subject of interest when the speaker addresses that participant. In at least one example, an object will be the subject of interest when the speaker makes hand gestures directed towards the object. In at least one example, a meeting participant at an endpoint with a speaker will be the subject of interest when the speaker discusses that meeting participant in the third person. In accordance with examples of this disclosure, one or more views depicting the subject of interest will be transmitted to a remote endpoint for viewing.

Aspects of this disclosure pertain to optimizing how a subject of interest is framed. At least one example of this disclosure is directed to determining where to locate a subject of interest within a frame. In at least one example, when the subject of interest is a person who has at least one eye in a capturing camera's field of view, the degree to which that person's is placed away from the centroid of a rendered frame is a function of the degree to which that person is looking away from the capturing camera.

In at least one example of this disclosure, an object or person will be a subject of interest when most participants at an endpoint look at that object or person. In at least one example of this disclosure, an object or person will be a subject of interest when a plurality of participants at an endpoint looks at that object or person.

In at least one example of this disclosure, head pose estimation is used as a cue to find the object or person at which participants are looking. In at least one example, eye gaze estimation is used as a cue to find the object or person at which participants are looking. In at least one example of this disclosure, head pose estimation and eye gaze estimation are used as cues to find the object or person at which participants are looking. In at least one example, a voting module takes head pose and eye gaze estimation data and finds the "hot areas" that are currently grabbing people's attention. In some examples, an object detection module determines whether there are objects about the "hot areas." Objects may be people or things, such as, whiteboards, screens, flipcharts, or products.

In at least one example of this disclosure, a decision will be to present a view containing the subject of interest. Presenting the view can include switching from an earlier view. Switching the view can include switching between cameras, panning or zooming (mechanically or electronically) one of the cameras, switching to a content stream, switching to the output of a smart board, and switching to a dedicated white board camera.

In at least one example of this disclosure, a focus estimation model is used to determine where people are looking in a frame or series of frames. In this example, focus estimation is performed by a neural network trained to take an input image and output a focus map. The focus map is a probability distribution indicating how likely it is that people at a particular location care about a particular area.

Technical benefits of determining areas of interest within meeting spaces include helping to determine what kind of meeting space makes meetings more efficient, determining how to reduce distractions, and deciding for how long to schedule a meeting.

In accordance with examples of this disclosure, once a subject of interest has been identified, a determination is made as to how to display the subject of interest in an optimized manner.

Figure 1:
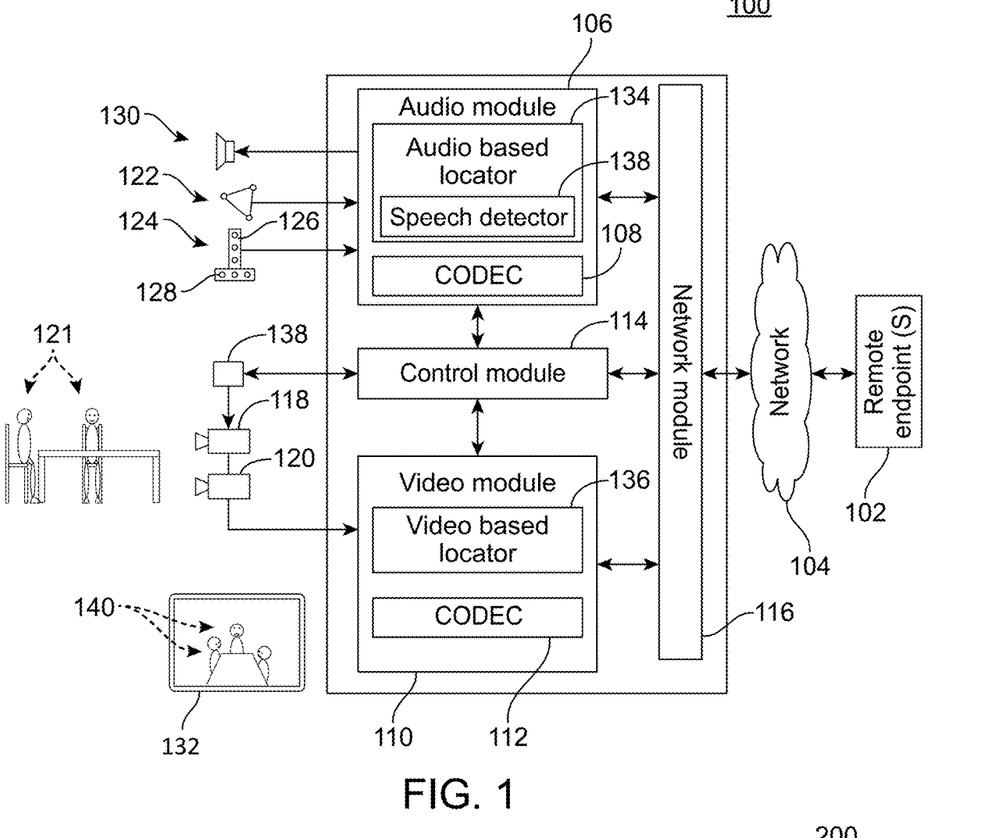
FIG. 1 illustrates a videoconferencing endpoint, in accordance with an example of this disclosure.

FIG. 1 illustrates a videoconferencing endpoint 100 in accordance with an example of this disclosure. The videoconferencing apparatus or endpoint 100 communicates with one or more remote endpoints 102 over a network 104. Components of the endpoint 100 include an audio module 106 with an audio codec 108 and has a video module 110 with a video codec 112. Modules 106, 110 operatively couple to a control module 114 and a network module 116. In one or more examples, endpoint 100 includes exactly one wide angle electronic-pan-tilt-zoom camera. In some examples, when a view subject is zoomed in upon, a sub-portion of the captured image containing the subject is rendered, whereas other portions of the image are not.

During a videoconference, two or more cameras (e.g., camera 118 and camera 120) capture video and provide the captured video to the video module 110 and codec 112 for processing. In at least one example of this disclosure, one camera (e.g., 118) is a smart camera and one camera (e.g., 120) is not a smart camera. In some examples, two or more cameras (e.g., camera 118 and camera 120) are cascaded such that one camera controls some or all operations of the other camera. In some examples, two or more cameras (e.g., camera 118 and camera 120) are cascaded such that data captured by one camera is used (e.g., by control module 114) to control some or all operations of the other camera. Additionally, one or more microphones 122 capture audio and provide the audio to the audio module 106 and codec 108 for processing. These microphones 122 can be table or ceiling microphones, or they can be part of a microphone pod or the like. In one or more examples, the microphones 122 are tightly coupled with one or more cameras (e.g., camera 118 and camera 120). The endpoint 100 uses the audio captured with these microphones 122 primarily for the conference audio.

Endpoint 100 also includes microphone array 124, in which subarray 126 is orthogonally arranged with subarray 128. Microphone array 124 also captures audio and provides the audio to the audio module 22 for processing. In some examples, microphone array 124 includes both vertically and horizontally arranged microphones for determining locations of audio sources, e.g., people who are speaking. In some examples, the endpoint 100 uses audio from the array 124 primarily for camera tracking purposes and not for conference audio. In some examples, endpoint 100 uses audio from the array 124 for both camera tracking and conference audio.

After capturing audio and video, the endpoint 100 encodes the audio and video in accordance with an encoding standard, such as MPEG-1, MPEG-2, MPEG-4, H.261, H.263 and H.264. Then, the network module 116 outputs the encoded audio and video to the remote endpoints 102 via the network 104 using an appropriate protocol. Similarly, the network module 116 receives conference audio and video through the network 104 from the remote endpoints 102 and transmits the received audio and video to their respective codecs 108/112 for processing. Endpoint 100 also includes a loudspeaker 130 which outputs conference audio, and a display 132 outputs conference video.

In at least one example of this disclosure, the endpoint 100 uses the two or more cameras 118, 120 in an automated and coordinated manner to handle video and views of the videoconference environment dynamically. In some examples, a first camera (e.g. 118) is a fixed or room-view camera, and a second camera 120 is a controlled or people-view camera. Using the room-view camera (e.g. 118), the endpoint 100 captures video of the room or at least a wide or zoomed-out view of the room that would typically include all the videoconference participants 121 as well as some of their surroundings.

According to some examples, the endpoint 100 uses the people-view camera (e.g., 120) to capture video of one or more participants, including one or more current talkers, in a tight or zoomed-in view. In at least one example, the people-view camera (e.g., 120) can pan, tilt and/or zoom.

In one arrangement, the people-view camera (e.g., 120) is a steerable pan-tilt-zoom (PTZ) camera, while the room-view camera (e.g., 118) is an electronic pan-tilt-zoom (EPTZ) camera. As such, the people-view camera (e.g., 120) can be steered, while the room-view camera (e.g., 118) cannot. In at least one example, both camera 118 and camera 120 are EPTZ cameras. In at least one example, camera 118 is associated with a sound source locator module 134. In fact, both cameras 118, 120 can be steerable PTZ cameras.

In some examples, the endpoint 100 will alternate between tight views of a speaker and wide views of a room. In some examples, the endpoint 100 alternates between two different tight views of the same or different speaker. In some examples, the endpoint 100 will capture a first view of a person with one camera and a second view of the same person with another camera and determine which view is better for sharing with a remote endpoint 102.

In at least one example of this disclosure, the endpoint 100 outputs video from only one of the two cameras 118, 120 at any given time. As the videoconference proceeds, the output video from the endpoint 100 can switch from the view of one camera to another. In accordance with some examples, the system 100 outputs a room-view when there is no participant speaking a people-view when one or more participants 121 are speaking.

In accordance with an example, the endpoint 100 can transmit video from both cameras 118, 120 simultaneously, and the endpoint 100 can let the remote endpoint 102 decide which view to display, or determine that one view will be displayed relative the other view in a specific manner. For example, one view can be composited as a picture-in-picture of the other view.

In one or more examples, the endpoint 100 uses audio-based locator 134 and a video-based locator 136 to determine locations of participants 121 and frame views of the environment and participants 121. The control module 114 uses audio and/or video information from these locators 134, 136 to crop one or more captured views, such that one or more subsections of a captured view will be displayed on a display 132 and/or transmitted to a remote endpoint 102. In some examples, commands to one or both cameras 118, 120 are implemented by an actuator or local control unit 137 having motors, servos, and the like to steer one or both cameras 118, 120 mechanically. In some examples, such camera commands can be implemented as electronic signals by one or both cameras 118, 120.

In some examples, to determine which camera's view to use and how to configure a view, the control module 114 uses audio information obtained from the audio-based locator 134 and/or video information obtained from the video-based locator 136. For example, the control module 114 uses audio information processed by the audio-based locator 134 from the horizontally and vertically arranged microphone subarrays 126, 128. The audio-based locator 134 uses a speech detector 138 to detect speech in captured audio from subarrays 126, 128 to determine a location of a current participant. The control module 114 uses the determined location to steer the people-view camera toward that location. In some examples, the control module 114 uses video information captured using the cameras 118, 120 and processed by the video-based locator 136 to determine the locations of participants 121, to determine the framing for the views, and to steer the one or more of the cameras (e.g., 118, 120). In other examples, none of the cameras is physically steerable.

A wide view from one camera (e.g., 118) can give context to a zoomed view from another camera (e.g., 120) so that participants 121 at the far-end 102 see video from one camera (e.g., 118) as the video from the other camera (e.g., 120) is being adjusted. In some examples, transitions between the two views from the cameras 118, 120 can be faded and blended to avoid sharp cut-a-ways when switching between camera views. In some examples, a switch from a first view to a second view for transmission to a remote endpoint 102 will not occur until an active participant 121 has been present in the second view for a minimum amount of time. In at least one example of this disclosure, the minimum amount of time is one second. In at least one example, the minimum amount of time is two seconds. In at least one example, the minimum amount of time is three seconds. In at least one example, the minimum amount of time is four seconds. In at least one example, the minimum amount of time is five seconds. In other examples, other minima (e.g., 0.5-7.0 seconds) are used, depending on such factors as the size of a conference room, the number of participants 121 at an endpoint 100, the cultural niceties of the participants 140 at the remote endpoint 102, and the sizes of one or more displays 132 displaying captured views.

Figure 2A:
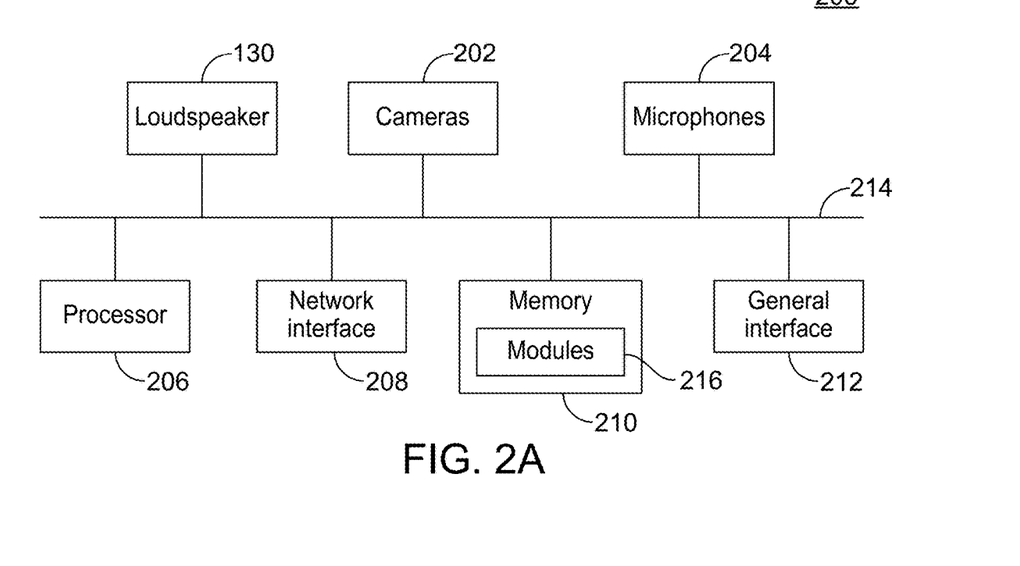
FIG. 2A illustrates aspects of the videoconferencing endpoint of FIG. 1.

FIG. 2A illustrates aspects of videoconferencing endpoint 200 (e.g., 100), in accordance with an example of this disclosure. The endpoint 200 includes a loudspeaker 130, cameras 202 (e.g., 118, 120) and microphones 204 (e.g., 122, 124). The endpoint 200 also includes a processing unit 206, a network interface 208, a memory 210 and an input/output interface 212, all coupled by bus 101.

The memory 104 can be any conventional memory such as SDRAM and can store modules 216 in the form of software and firmware for controlling the endpoint 200. In addition to audio and video codecs (108, 112) and other modules discussed previously, the modules 216 can include operating systems, a graphical user interface (GUI) that enables users to control the endpoint 200, and algorithms for processing audio/video signals and controlling the cameras 202. In at least one example of this disclosure, one or more of the cameras 202 can be a panoramic camera.

The network interface 208 enables communications between the endpoint 200 and remote endpoints (102). In one or more examples, the interface 212 provides data transmission with local devices such as a keyboard, mouse, printer, overhead projector, display, external loudspeakers, additional cameras, and microphone pods, etc.

The cameras 202 and the microphones 204 capture video and audio, respectively, in the videoconference environment and produce video and audio signals transmitted through the bus 214 to the processing unit 206. In at least one example of this disclosure, the processing unit 206 processes the video and audio using algorithms in the modules 216. For example, the endpoint 200 processes the audio captured by the microphones 204 as well as the video captured by the cameras 202 to determine the location of participants 121 and control and select from the views of the cameras 202. Processed audio and video can be sent to remote devices coupled to network interface 208 and devices coupled to general interface 212.

Figure 2B:
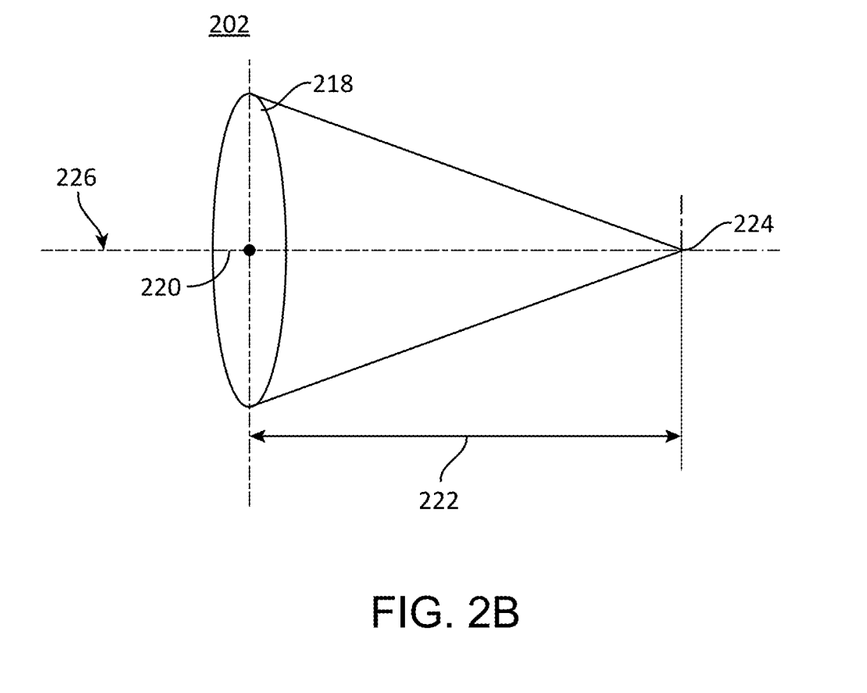
FIG. 2B illustrates aspects of a camera, in accordance with an example of this disclosure.

FIG. 2B illustrates aspects of a camera 202, in accordance with an example of this disclosure. The camera 202 has a lens 218. The lens 218 has a central region or centroid 220, and a focal length 222 between the center 352 of the lens 218 and a focal point 224 of the lens 218. The focal length 222 lies along the lens's focal line 307, which is normal (perpendicular) to the lens 218.

FIGS. 3A-E illustrate receiving and evaluating a frame of image data, in accordance with an example of this disclosure.

Figure 3A:
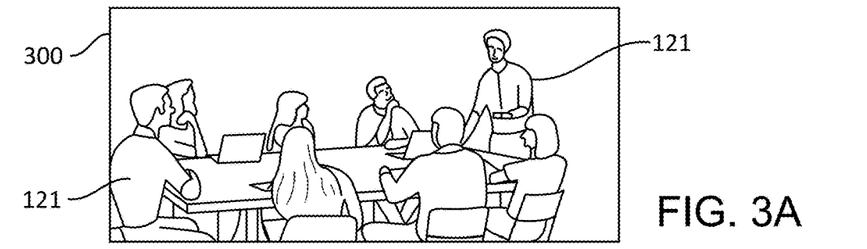
FIGS. 3A-E illustrate receiving and evaluating a frame of image data, in accordance with an example of this disclosure.

FIG. 3A illustrates a frame 300 of image data, in accordance with an example of this disclosure. The frame 300 contains a view of a meeting room, with a number of meeting participants 121.

Figure 3B:
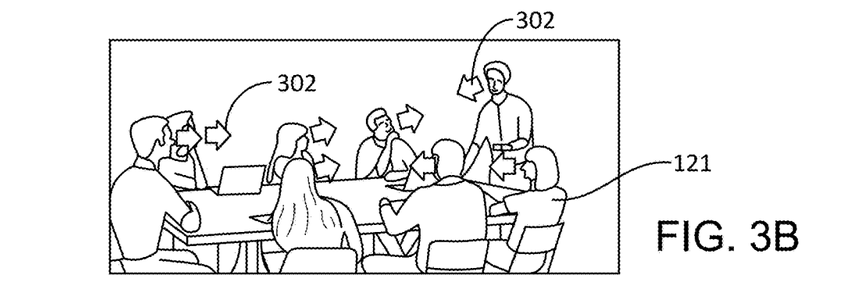

FIG. 3B illustrates that the directions 302 which the participants 121 are looking are evaluated. In at least one example, such evaluation is based on estimating the head poses of the participants 121. In at least one example, such evaluation is based on estimating the eye gaze of the participants 121.

Figure 3C:
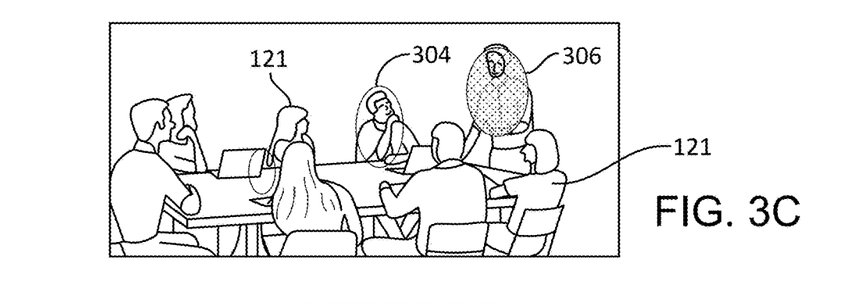

FIG. 3C illustrates that, based on the directional information garnered with respect to FIG. 3B, some of the participants 121 are looking at a first "hot area" 304 and some of the participants 121 are looking at a second "hot area" 306.

Figure 3D:
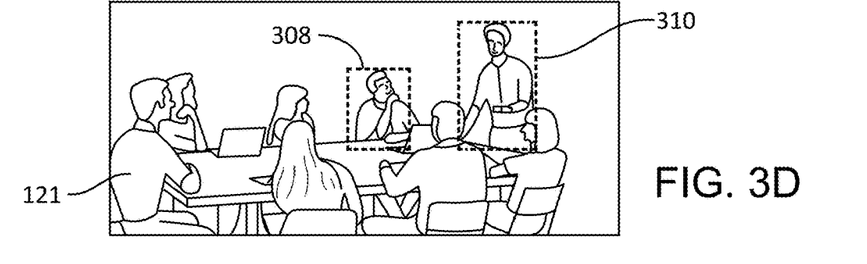

FIG. 3D illustrates that once the hot areas 304, 306 are identified, a determination is then made as to whether the hot areas 304, 306 contain objects. In FIG. 3D, it can be seen that hot area 304 contains a first meeting participant and hot area 306 contains a second meeting participant. It is worth noting that while a determination as to whether any of the participants 121 is currently speaking can be used when evaluating who (or what) is the current focus of interest, examples of this disclosure do not require determining who is an active talker.

Figure 3E:
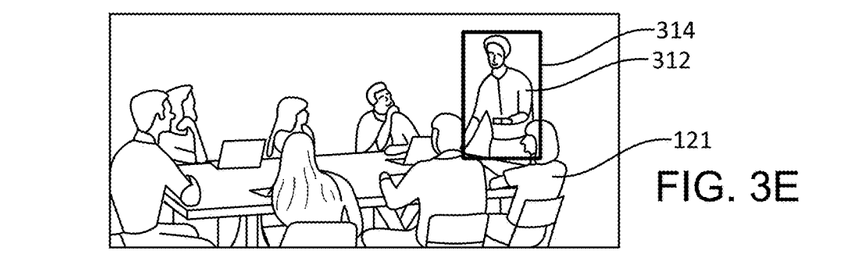

FIG. 3E illustrates once it has been confirmed that the hot areas correspond to objects, a final determination is then made concerning which object (person) is the subject of interest 312. The subject of interest 312 can be bounded within a bounded region 314 of the frame 300. The image data within the bounded region 314 can be rendered, such as by transmitting the image data to other meeting participants 140 at a remote endpoint 102.

Figure 4A:
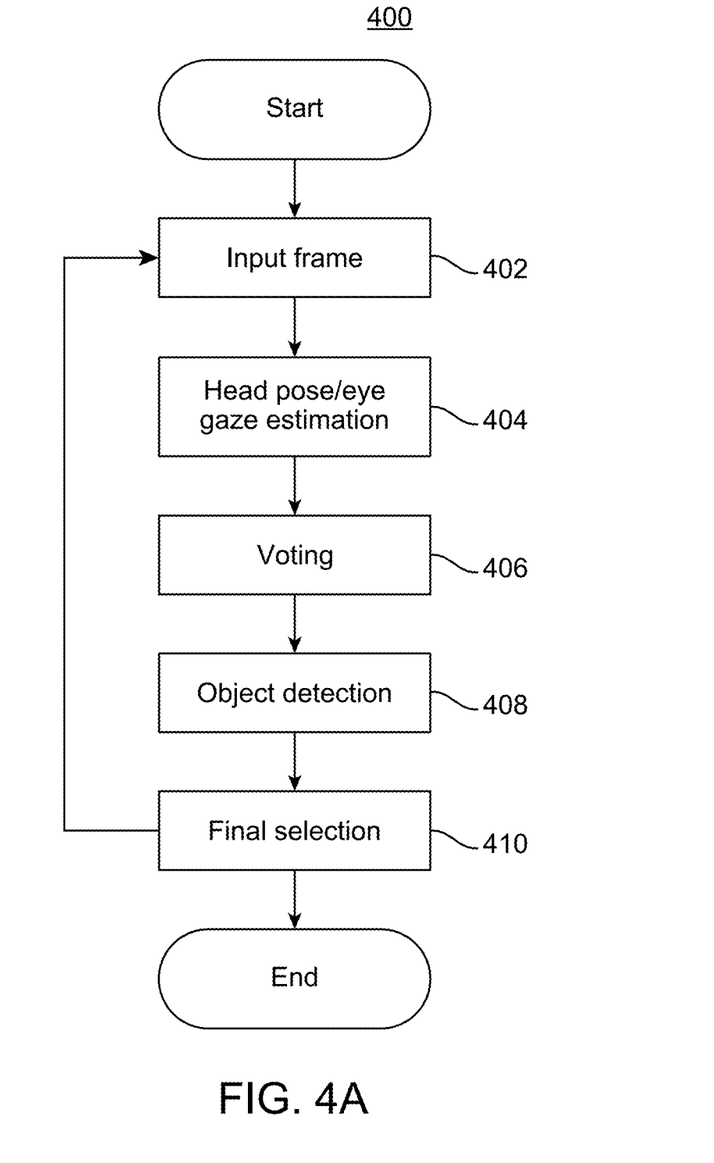
FIG. 4A illustrates a method of determining a subject of interest, in accordance with an example of this disclosure.

FIG. 4A illustrates a method 401 of determining a subject of interest, in accordance with an example of this disclosure. At step 402 an input frame (e.g., 300) is received, such as from a camera 202. At step 404, head pose estimation and eye gaze estimation are used as cues to find the object or person participants are looking at. At step 406, a voting module then takes the estimation data and finds the "hot areas" that are grabbing people's attention. Thereafter, an object detection module determines 408 if there are objects in or near the "hot areas". As noted, objects may be people (such as divined through facial detection operations), whiteboards, screens, flipcharts, posters, and the like. Thereafter, in step 410, a final decision is made (alone, or in concert with other information) and a view containing the subject of interest 312 is rendered. The method 400 may end or return to step 402 in which another frame of image data is received.

Figure 4B:
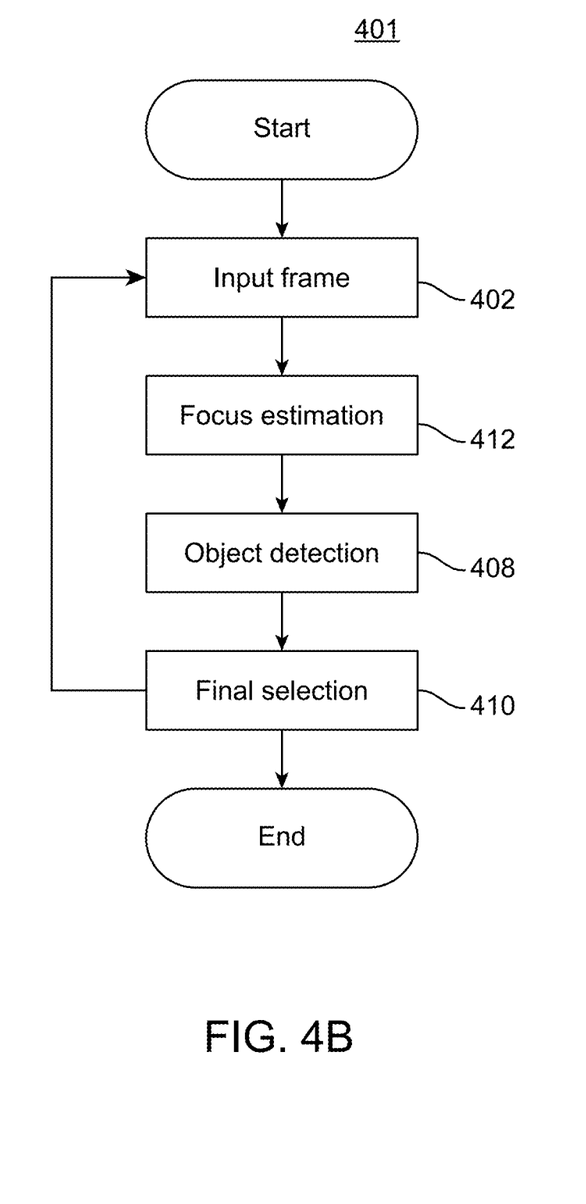
FIG. 4B illustrates another method of determining a subject of interest, in accordance with an example of this disclosure.

FIG. 4B illustrates another method 401 of finding a subject of interest, in accordance with an example of this disclosure. At step 402 an input frame (e.g., 300) is received, such as from a camera 202. At step 412, a focus estimation model is used to evaluate 412 where participants' attention is focused. Focus estimation 412 is performed using a neural network trained to take an input image (e.g., 300) and output a focus map (not shown). A focus map contains a probability distribution indicating how likely it is that people (e.g., 121) at an endpoint 100 are focusing their attention towards a given area. After step 412 is complete, an object detection module determines 408 if there are objects in the neighborhood of the "hot areas". As noted, objects may be people (such as divined through facial detection operations), whiteboards, screens, flipcharts, posters, and the like. Thereafter, in step 410, the subject of interest is finally determined (alone, or in concert with other information) and a view containing the subject of interest 312 is rendered. The method 400 may end or return to step 402 in which another frame of image data is received.

Figure 5:
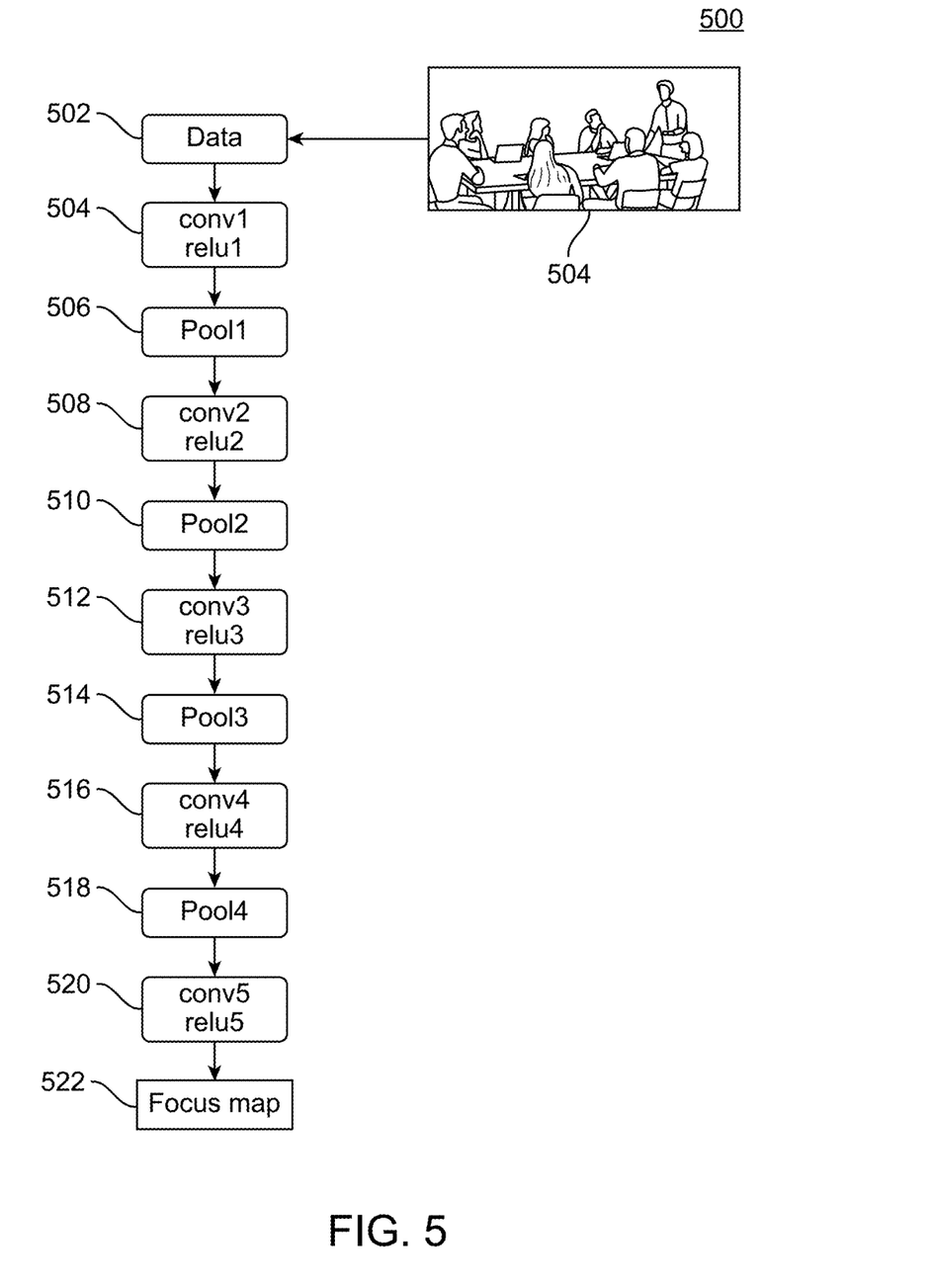
FIG. 5 illustrates a focus estimation model, in accordance with an example of this disclosure.

FIG. 5 illustrates a focus estimation model 500, in accordance with examples of this disclosure. As described with respect to FIG. 4B, a view frame 504 (e.g., 300) is captured by a camera 202. The image data 502 corresponding to a frame of the view passes to a first convolutional layer 504 and a first rectified linear activation function is applied. The rectified output of the first convolutional layer then passes to a first pooling layer 506. The output of the first pooling layer 506 then passes to a second convolutional layer 508 and a second rectified linear activation function is applied. The rectified output of the second convolutional layer then passes to a second pooling layer 510. The output of the second pooling layer 510 then passes to a third convolutional layer 512 and a third rectified linear activation function is applied. The rectified output of the third convolutional layer 512 then passes to a third pooling layer 514. The output of the third pooling layer 514 then passes to a fourth convolutional layer 516 and a fourth rectified linear activation function is applied. The rectified output of the fourth convolutional layer 516 then passes to a fourth pooling layer 518. The output of the fourth pooling layer 518 then passes to a fifth convolutional layer 520 and a fifth rectified linear activation function is applied. The rectified output of the fifth convolutional layer 520 contains a focus map 522. The focus map 522 is used to identify the subject of interest (e.g., 312) in the manner discussed above.

Figure 6:
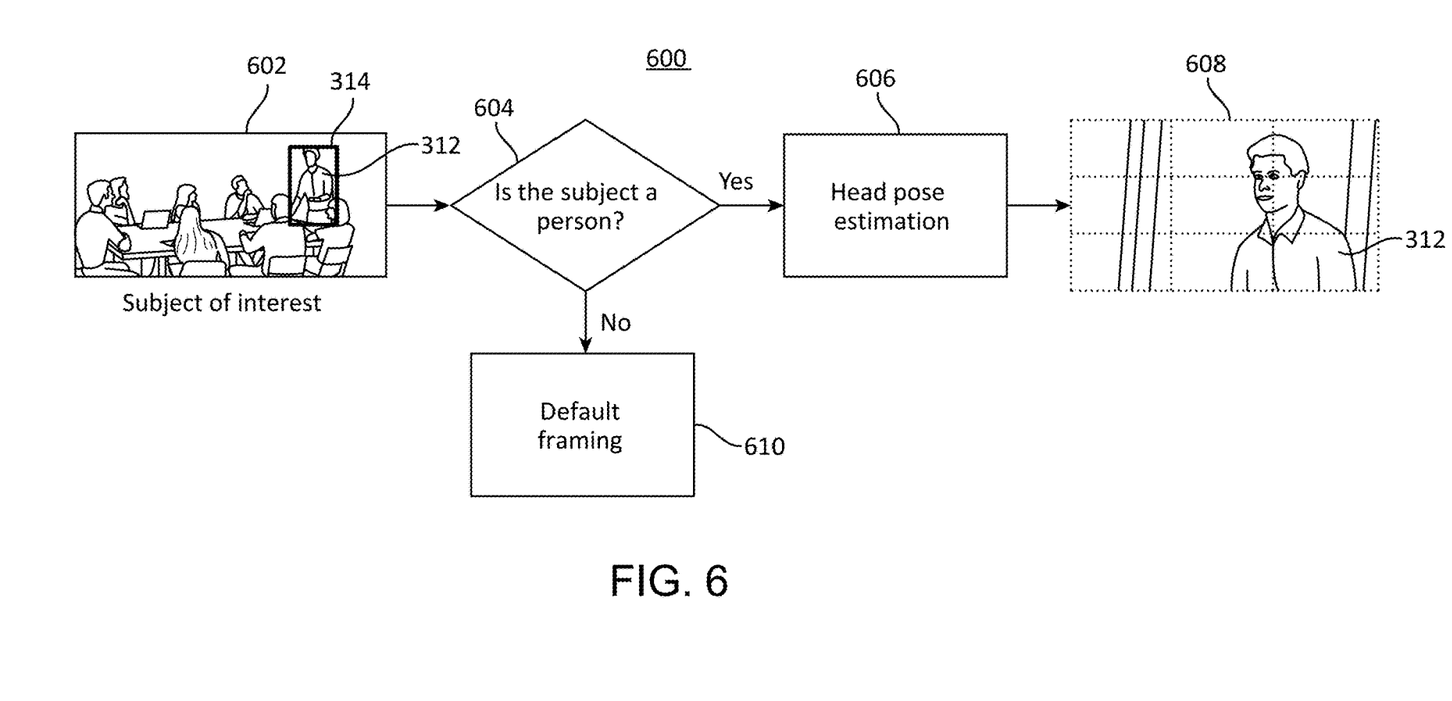
FIG. 6 illustrates a method of framing a subject of interest, in accordance with an example of this disclosure.

FIG. 6 illustrates a method 600 of framing a subject of interest 312. The method 600 begins by identifying (locating) 602 a subject of interest 312 within a frame of image data, such as by method 400 and/or method 401. The subject of interest 312 is initially framed within a default frame (bounded area) 314. A determination is then made 604 as to whether the subject of interest 312 is a person. If the subject of interest 312 is a person, the method 600 proceeds to estimate 606 the orientation of the person's head (or face). A portion of the original frame of image data containing the subject of interest 312 is then selected 608 for rendering, such as by sending the image data to a remote endpoint 104. According to the method 600, selection 608 of the portion of the frame is done so as to place the subject of interest 312 within the shared view in a manner that is pleasing to a meeting participant looking at the view on a display device (e.g., 132). If, on the other hand, it is determined that the subject of interest 312 is not a person, then a default frame in which the subject of interest is substantially centered in the view will be used.

Figure 7A:
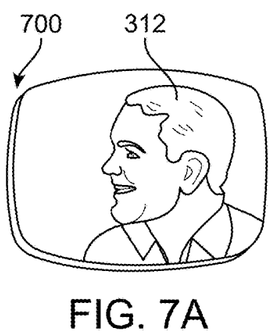
FIGS. 7A-F illustrate aspects of framing a subject of interest, in accordance with the method of FIG. 6.
Figure 7B:
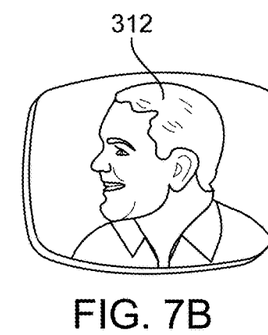
Figure 7C:
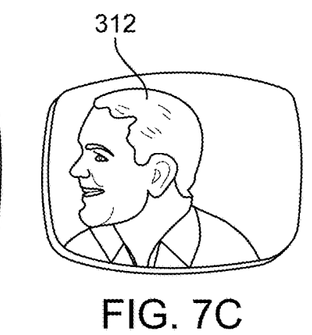

FIGS. 7A-F illustrate aspects of locating a subject of interest 312 within a rendered portion of a frame. In FIG. 7A, the subject of interest 312 is looking towards the left side of the frame, and so is correctly placed right of center. FIG. 7B has the same subject of interest 312 centered in the frame, and FIG. 7C has the subject of interest left of center. The location of the subject of interest 312 within the frame of FIG. 7A is the most visually pleasing of the three views in the top row of the page.

Figure 7D:
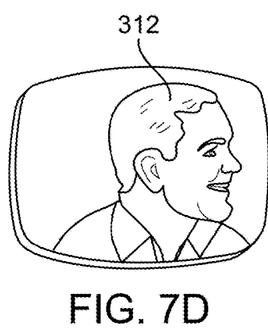
Figure 7E:
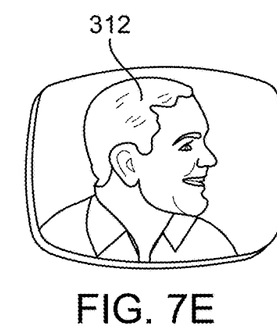
Figure 7F:
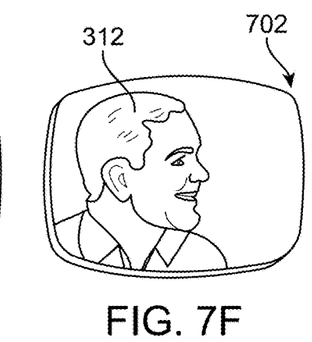

In FIG. 7D, the subject of interest 312 is looking towards the right side of the frame, and is placed right of center, which is off-putting. FIG. 7E has the same subject of interest 312 centered in the frame, which is an improvement over FIG. 7E. FIG. 7F has the subject of interest correctly located left of center, and furthest from the right side 702. The location of the subject of interest 312 within the frame of FIG. 7F is the most visually pleasing of the three views in the middle row of the page.

Figure 8A:
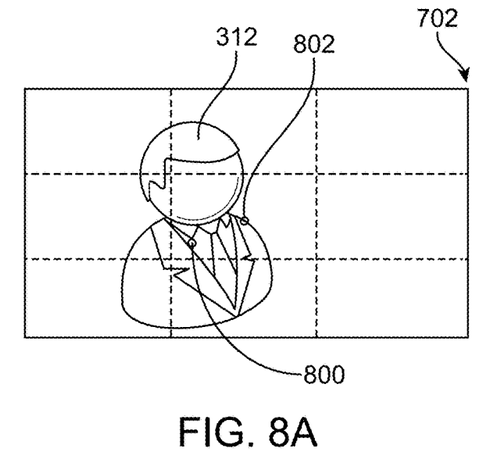
FIGS. 8A-B illustrate other aspects of framing a subject of interest in accordance with the method of FIG. 6.
Figure 8B:
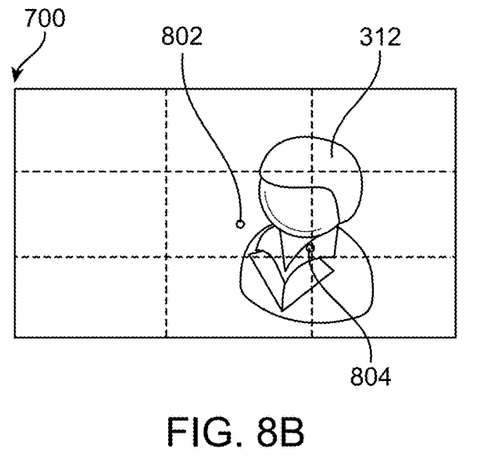

FIGS. 8A-B illustrate aspects of locating a subject of interest 312 within a rendered portion of a frame. In FIG. 8A, the subject 312 is looking towards the right 702 of the frame. A centroid 800 of (the depiction of) the subject of interest 312 lies to the left of the center 802 of the frame and is thus properly placed for viewing. On the other hand, in FIG. 8B, the subject 312 is looking towards the right 700 of the frame. A centroid 804 of (the depiction of) the subject of interest 312 lies to the right of the center 802 of the frame and is thus properly placed for viewing.

Figure 9:
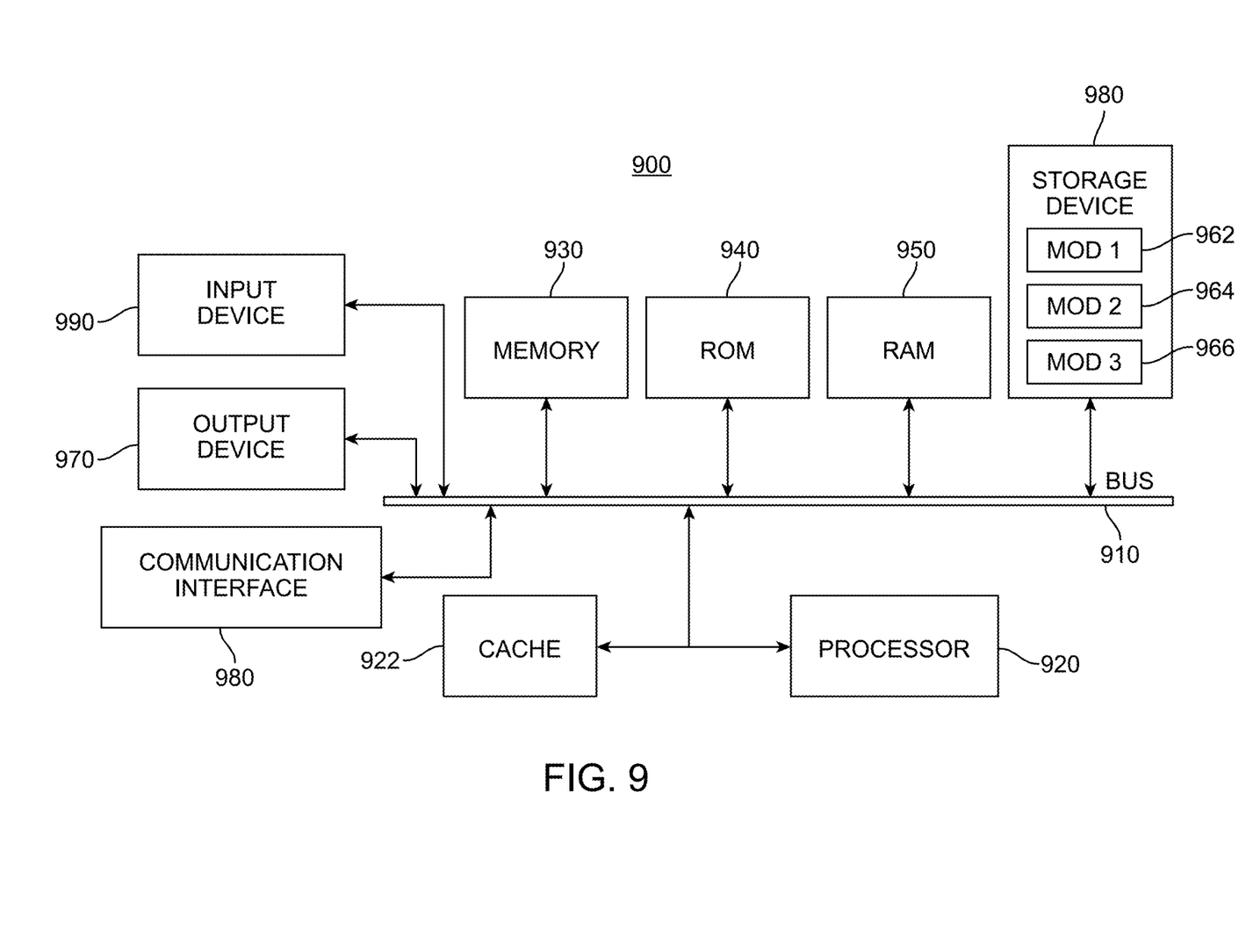
FIG. 9 illustrates an electronic device which can be employed to practice the concepts and methods of this disclosure.

FIG. 9 illustrates an electronic device 900 (e.g., 100, 200) which can be employed to practice the concepts and methods described. The components disclosed described can be incorporated in whole or in part into tablet computers, personal computers, handsets and other devices utilizing one or more microphones. As shown, device 900 can include a processing unit (CPU or processor) 920 and a system bus 910. System bus 910 interconnects various system components—including the system memory 930 such as read only memory (ROM) 940 and random-access memory (RAM) 950—to the processor 320. The processor can comprise one or more digital signal processors. The device 900 can include a cache 922 of high-speed memory connected directly with, near, or integrated as part of the processor 920. The device 900 copies data from the memory 930 and/or the storage device 960 to the cache 922 for quick access by the processor 920. In this way, the cache provides a performance boost that avoids processor 920 delays while waiting for data. These and other modules can control or be configured to control the processor 920 to perform various actions. Other system memory 930 may be available for use as well. The memory 930 can include multiple different types of memory with different performance characteristics. The processor 920 can include any general-purpose processor and a hardware module or software module, such as module 1 (962), module 2 (964), and module 3 (966) stored in storage device 960, configured to control the processor 920 as well as a special-purpose processor where software instructions are incorporated into the actual processor design. The processor 920 may essentially be a completely self-contained computing system, containing multiple cores or processors, a bus, memory controller, cache, etc. A multi-core processor may be symmetric or asymmetric.

The system bus 910 may be any of several types of bus structures including a memory bus or memory controller, a peripheral bus, and a local bus using any of a variety of bus architectures. A basic input/output system (BIOS) stored in ROM 940 or the like, may provide the basic routine that helps to transfer information between elements within the device 900, such as during start-up. The device 900 further includes storage devices 960 such as a hard disk drive, a magnetic disk drive, an optical disk drive, tape drive or the like. The storage device 960 can include software modules 962, 964, 966 for controlling the processor 920. Other hardware or software modules are contemplated. The storage device 960 is connected to the system bus 910 by a drive interface. The drives and the associated computer readable storage media provide nonvolatile storage of computer readable instructions, data structures, program modules and other data for the device 900. In at least one example, a hardware module that performs a function includes the software component stored in a non-transitory computer-readable medium coupled to the hardware components—such as the processor 920, bus 910, output device 970, and so forth—necessary to carry out the function.

For clarity of explanation, the device of FIG. 9 is presented as including individual functional blocks including functional blocks labeled as a "processor."The functions these blocks represent may be provided using either shared or dedicated hardware, including, but not limited to, hardware capable of executing software and hardware, such as a processor 920, that is purpose-built to operate as an equivalent to software executing on a general-purpose processor. For example, the functions of one or more processors presented in FIG. 9 may be provided by a single shared processor or multiple processors. (Use of the term "processor" should not be construed to refer exclusively to hardware capable of executing software.) One or more examples of this disclosure include microprocessor hardware, and/or digital signal processor (DSP) hardware, read-only memory (ROM) 940 for storing software performing the operations discussed in one or more examples below, and random-access memory (RAM) 950 for storing results. Very large-scale integration (VLSI) hardware embodiments, as well as custom VLSI circuitry in combination with a general-purpose DSP circuit (933, 935), can also be used.

Examples of this disclosure also include:

1. A method of view selection in a teleconferencing environment, comprising: receiving a frame of image data from an optical sensor; detecting one or more conference participants within the frame of image data; identifying an interest region for each of the one or more conference participants, wherein identifying the interest region for each of the one or more conference participants comprises estimating a head pose of a first participant from among the one or more conference participants; determining that a majority of the interest regions overlap in an overlapping region; detecting an object within the overlapping region; determining that the object within the overlapping region is a subject of interest; and rendering a view containing the subject of interest.

2. The method of example 1, wherein identifying the interest region for each of the one or more conference participants further comprises estimating a gaze of a second participant from among the one or conference participants.

3. The method of example 2, wherein the first participant and the second participant are different.

4. The method of example 1, wherein identifying the interest region for each of the one or more conference participants further comprises generating a focus map using a neural network.

5. The method of example 1, wherein determining that the object within the overlapping region is the subject of interest further comprises determining that the object corresponds to a person.

6. The method of example 5, wherein determining the object corresponds to a person comprises determining that the object corresponds to a non-speaking person.

7. The method of example 5, wherein rendering the view containing the subject of interest comprises: determining a centroid corresponding to the subject of interest; determining a gaze of the subject of interest relative a lens of the optical sensor used to capture the view containing the subject of interest, the lens having a central region; determining that the gaze of the subject of interest is offset from a normal of the central region by at least fifteen degrees; and locating the subject of interest within the view such that the centroid of the subject of interest is off-set from a centroid of the view.

8. The method of example 7, wherein locating the subject of interest within the view such that the centroid of the subject of interest is off-set from a centroid of the view comprises bounding the subject of interest within a rectangularly bounded region having a horizontal width and placing the subject of interest within the rectangularly bounded region such that the centroid of the subject of interest is displaced horizontally from a boundary of the rectangularly bounded region towards which the gaze is more directed, by a distance corresponding to between one-half and two-thirds of the horizontal width. Other distances and ranges are encompassed within this disclosure, such as between one half and three-fourths, and between three-fifths and two thirds.

9. A teleconferencing endpoint, comprising: an optical sensor configured to receive a frame of image data; a processor coupled to the optical sensor, wherein the processor is configured to: detect one or more conference participants within the frame of image data; identify an interest region for each of the one or more conference participants by estimating a head pose of a first participant from among the one or more conference participants; determine that most of the interest regions overlap in an overlapping region; detect an object within the overlapping region; determine that the object within the overlapping region is a subject of interest; and render a view containing the subject of interest.

10. The teleconferencing endpoint of example 9, wherein the processor is further configured to identify the interest region for each of the one or more conference participants further comprises estimating a gaze of a second participant from among the one or conference participants.

11. The teleconferencing endpoint of example 10, wherein the first participant and the second participant are different.

12. The teleconferencing endpoint of example 9, wherein the processor is further configured to identify the interest region for each of the one or more conference participants based on a focus map generated using a neural network.

13. The teleconferencing endpoint of example 9, wherein the processor is further configured to determine that the subject of interest corresponds to a person.

14. The teleconferencing endpoint of example 13, wherein the person is not an active talker.

15. The teleconferencing endpoint of example 13, wherein the processor is further configured to rendering the view containing the subject of interest by: determining a centroid corresponding to the subject of interest; determining a gaze of the subject of interest relative a lens of the optical sensor used to capture the view containing the subject of interest, the lens having a central region; determining that the gaze of the subject of interest is offset from a normal of the central region by at least fifteen degrees; and locating the subject of interest within the view such that the centroid of the subject of interest is off-set from a centroid of the view.

16. The teleconferencing endpoint of example 15, wherein the processor is further configured to: locate the subject of interest within the view such that the centroid of the subject of interest is off-set from a centroid of the view by bounding the subject of interest within a rectangularly bounded region having a horizontal width; and place the subject of interest within the rectangularly bounded region such that the centroid of the subject of interest is displaced horizontally from a boundary of the rectangularly bounded region towards which the gaze is more directed, by a distance corresponding to two-thirds of the horizontal width.

17. A non-transitory computer readable medium storing instructions executable by a processor, the instructions comprising instructions to: receive a frame of image data from an optical sensor; detect one or more conference participants within the frame of image data; identify an interest region for each of the one or more conference participants, wherein identifying the interest region for each of the one or more conference participants comprises estimating a head pose of a first participant from among the one or more conference participants; determine that more of the interest regions overlap in an overlapping region; detect an object within the overlapping region; determine that the object within the overlapping region is a subject of interest; and render a view containing the subject of interest within a transmission to a remote endpoint.

18. The non-transitory computer readable medium of example 17, wherein the instructions to identify the interest region for each of the one or more conference participants further comprise instructions to estimate a gaze of a second participant from among the one or conference participants.

19. The non-transitory computer readable medium of example 17, wherein the instructions to identify the interest region for each of the one or more conference participants further comprise instructions to generate a focus map using a neural network.

20. The non-transitory computer readable medium of example 17, wherein the instructions to determine that the object within the overlapping region is the subject of interest further comprise instructions to determine that the object corresponds to a person.

21. The non-transitory computer readable medium of example 20, wherein the instructions to render the view containing the subject of interest comprise instructions to: determine a centroid corresponding to the subject of interest; determine a gaze of the subject of interest relative a lens of the optical sensor used to capture the view containing the subject of interest, the lens having a central region; determine that the gaze of the subject of interest is offset from a normal of the central region by at least fifteen degrees; and locate the subject of interest within the view such that the centroid of the subject of interest is off-set from a centroid of the view.

The various examples described above are provided by way of illustration and should not be construed to limit the scope of the disclosure. Various modifications and changes can be made to the principles and examples described herein without departing from the scope of the disclosure and without departing from the claims which follow.

The invention claimed is:

1. A method of view selection in a teleconferencing environment, comprising:
receiving a frame of image data from a camera;
detecting one or more conference participants within the frame of image data;
deriving, using a neural network, a focus map based, at least in part, on the frame of image data, the focus map providing as a function of position a probability that the one or more conference participants are jointly focusing their attention there, the focus map including one or more relatively high probability areas;
detecting one or more objects corresponding to the one or more relatively high probability areas;
determining which of the one or more objects is a first subject of interest;
determining a centroid corresponding to the first subject of interest;
determining a gaze of the first subject of interest relative to a lens of the camera, the lens having a central region;
determining that the gaze of the first subject of interest is offset from the central region by at least fifteen degrees;
rendering a view containing the first subject of interest; and
positioning the first subject of interest within the view such that the centroid of the first subject of interest is offset from a center of the view.

2. The method of claim 1, further comprising:
receiving a subsequent frame of image data from the camera;
detecting one or more conference participants within the subsequent frame of image data;
updating, using the neural network, the focus map based, at least in part, on the subsequent frame of image data, wherein updating the focus map includes updating the one or more relatively high probability areas;
detecting one or more objects corresponding to the updated one or more relatively high probability areas;
determining which of the one or more objects corresponding to the updated one or more relatively high probability areas is a subsequent subject of interest; and
rendering a view containing the subsequent subject of interest.

3. The method of claim 2, wherein the subsequent subject of interest is the first subject of interest.

4. The method of claim 2, wherein the subsequent subject of interest is different from the first subject of interest.

5. The method of claim 1, wherein determining which of the one or more objects is the first subject of interest comprises determining whether any of the one or more objects corresponds to a person.

6. The method of claim 5, wherein determining whether any of the one or more objects corresponds to a person comprises determining whether any of the one or more objects corresponds to a non-speaking person.

7. The method of claim 1, wherein determining which of the one or more objects is the first subject of interest comprises determining whether any of the one or more objects corresponds to a diagram.

8. A teleconferencing endpoint, comprising:
a camera configured to capture frames of image data;
a processor coupled to the camera, wherein the processor is configured to:
receive a first frame of image data from the camera;
detect one or more conference participants within the first frame of image data;
derive, using a neural network, a focus map from the first frame of image data, the focus map providing as a function of position a probability that the one or more conference participants are jointly focusing their attention there, the focus map including one or more relatively high probability areas;
detect one or more objects corresponding to the one or more relatively high probability areas;
determine which of the one or more objects is a first subject of interest;
determine a centroid corresponding to the first subject of interest;
determine a gaze of the first subject of interest relative to a lens of the camera, the lens having a central region;
determine that the gaze of the first subject of interest is offset from the central region by at least fifteen degrees;
render a view containing the first subject of interest; and
position the first subject of interest within the view such that the centroid of the first subject of interest is offset from a center of the view.

9. The teleconferencing endpoint of claim 8, wherein the processor is further configured to:
receive a subsequent frame of image data from the camera;
detect one or more conference participants within the subsequent frame of image data;
update, using the neural network, the focus map based, at least in part, on the subsequent frame of image data, wherein updating the focus map includes updating the one or more relatively high probability areas;
detect one or more objects corresponding to the updated one or more relatively high probability areas;
determine which of the one or more objects corresponding to the updated one or more relatively high probability areas is a subsequent subject of interest; and
render a view containing the subsequent subject of interest.

10. The teleconferencing endpoint of claim 9, wherein the subsequent subject of interest is the first subject of interest.

11. The teleconferencing endpoint of claim 9, wherein the subsequent subject of interest is different from the first subject of interest.

12. The teleconferencing endpoint of claim 8, wherein the processor is further configured to determine that the first subject of interest corresponds to a person.

13. The teleconferencing endpoint of claim 12, wherein the person is not an active talker.

14. The teleconferencing endpoint of claim 8, wherein determining which of the one or more objects is the first subject of interest comprises determining whether any of the one or more objects corresponds to a whiteboard.

15. A non-transitory computer readable storage medium storing instructions executable by a processor, wherein the instructions comprise instructions to:
receive a frame of image data from a camera;
detect one or more conference participants within the frame of image data;
derive a focus map from the frame of image data using a neural network, the focus map providing as a function of position a probability that the one or more conference participants are jointly focusing their attention there, the focus map including one or more relatively high probability areas;
detect one or more objects corresponding to the one or more relatively high probability areas;
determine which of the one or more objects is a first subject of interest;
determine a centroid corresponding to the first subject of interest;
determine a gaze of the first subject of interest relative to a lens of the camera, the lens having a central region;
determine that the gaze of the first subject of interest is offset from the central region by at least fifteen degrees;
render a view containing the first subject of interest within a transmission to a remote endpoint; and
position the first subject of interest within the view such that the centroid of the first subject of interest is offset from a center of the view.

16. The non-transitory computer readable storage medium of claim 15, wherein the instructions further comprise instructions to:
receive a subsequent frame of image data from the camera;
detect one or more conference participants within the subsequent frame of image data;
update the focus map based on the subsequent frame of image data using the neural network, wherein updating the focus map includes updating the one or more relatively high probability areas;
detect one or more objects corresponding to the updated one or more relatively high probability areas;
determine which of the one or more objects corresponding to the updated one or more relatively high probability areas is a subsequent subject of interest; and
render a view containing the subsequent subject of interest.

17. The non-transitory computer readable storage medium of claim 16, wherein the subsequent subject of interest is the first subject of interest.

18. The non-transitory computer readable storage medium of claim 16, wherein the subsequent subject of interest is different from the first subject of interest.

19. The non-transitory computer readable storage medium of claim 16, wherein the instructions to determine which of the one or more objects corresponding to the updated one or more relatively high probability areas is the subsequent subject of interest comprise instructions to:
determine whether any of the one or more objects corresponding to the updated one or more relatively high probability areas corresponds to a whiteboard, display screen, flipchart, or poster.

20. The non-transitory computer readable storage medium of claim 15, wherein the instructions to determine which of the one or more objects is the first subject of interest comprise instructions to determine whether any of the one or more objects corresponds to a conference participant.

* * * * *